United States Patent
Wang

(10) Patent No.: US 11,940,941 B2
(45) Date of Patent: Mar. 26, 2024

(54) PCIe SWITCH WORKING MODE UPDATING METHOD AND RELATED ASSEMBLY

(71) Applicant: INSPUR SUZHOU INTELLIGENT TECHNOLOGY CO., LTD., Jiangsu (CN)

(72) Inventor: Shuming Wang, Shandong (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/270,240

(22) PCT Filed: Sep. 28, 2021

(86) PCT No.: PCT/CN2021/121426
§ 371 (c)(1),
(2) Date: Jun. 29, 2023

(87) PCT Pub. No.: WO2022/148072
PCT Pub. Date: Jul. 14, 2022

(65) Prior Publication Data
US 2023/0393841 A1    Dec. 7, 2023

(30) Foreign Application Priority Data
Jan. 7, 2021 (CN) .......................... 202110019337.7

(51) Int. Cl.
*G06F 13/40* (2006.01)
*G06F 8/71* (2018.01)

(52) U.S. Cl.
CPC ............ *G06F 13/4022* (2013.01); *G06F 8/71* (2013.01); *G06F 2213/0026* (2013.01)

(58) Field of Classification Search
CPC .......... G06F 8/65; G06F 8/71; G06F 13/4022; G06F 2213/0026
(Continued)

(56) References Cited

U.S. PATENT DOCUMENTS

2011/0296072 A1* 12/2011 Chang ................. G06F 13/4068
710/301
2014/0195711 A1* 7/2014 Bhatia .................... G06F 3/0664
710/313
(Continued)

FOREIGN PATENT DOCUMENTS

| CN | 110166301 A | 8/2019 |
|---|---|---|
| CN | 110780932 A | 2/2020 |

(Continued)

OTHER PUBLICATIONS

Wang et al "A Fast Configuration Technology of PCI Express Based on Partial Reconfiguration." 2012, [Online], pp. 152-155, [Retrieved from internet on Jan. 12, 2024], <https://ieeexplore.ieee.org/stamp/stamp.jsp?arnumber=6406941> (Year: 2012).*

*Primary Examiner* — S. Sough
*Assistant Examiner* — Zengpu Wei
(74) *Attorney, Agent, or Firm* — IPro, PLLC

(57) ABSTRACT

A PCIe switch working mode updating method and apparatus, an electronic device, and a computer-readable storage medium, which are applied to a controller. The PCIe switch working mode updating method includes: determining a required switch firmware version of a system according to system configuration information; determining the current switch firmware version according to the current port definition state of a PCIe switch; determining, according to the required switch firmware version and the current switch firmware version, whether a switch port reallocation operation needs to be executed; and under the condition that the switch port reallocation operation needs to be executed, sending, to the PCIe switch, a data file corresponding to the required switch firmware version, so that the PCIe switch updates a working mode according to the data file.

20 Claims, 6 Drawing Sheets

(58) Field of Classification Search
USPC .......................................................... 717/170
See application file for complete search history.

(56) References Cited

U.S. PATENT DOCUMENTS

2018/0101376 A1* 4/2018 Olarig ........................ G06F 8/63
2022/0374385 A1* 11/2022 Wan .................... G06F 13/4221

FOREIGN PATENT DOCUMENTS

| CN | 111092773 A | 5/2020 |
| CN | 111522559 A | 8/2020 |
| CN | 112748948 A | 5/2021 |
| EP | 3001310 A1 | 3/2016 |

* cited by examiner

| CONFIG_A | CONFIG_B | CONFIG_C | CONFIG_D | Switch fw version |
|---|---|---|---|---|
| 3'b000 | 3'b000 | 3'b000 | 3'b000 | V01 |
| 3'b001 | 3'b001 | 3'b001 | 3'b001 | V02 |
| ... | ... | ... | ... | ... |
| 3'b111 | 3'b111 | 3'b111 | 3'b111 | Reserved |

FIG. 2

| GPIO3 | GPIO2 | GPIO1 | Switch fw Version |
|---|---|---|---|
| 1'b0 | 1'b0 | 1'b0 | V01 |
| 1'b0 | 1'b0 | 1'b1 | V02 |
| ... | ... | ... | ... |
| 1'b1 | 1'b1 | 1'b1 | Reserved |

FIG. 3

PCIe SWITCH WORKING MODE UPDATING METHOD AND RELATED ASSEMBLY

The present application claims the priority of the Chinese patent application filed on Jan. 7, 2021 before the China National Intellectual Property Administration with the application number of 202110019337.7 and the title of "PCIE SWITCH WORKING MODE UPDATING METHOD AND RELATED ASSEMBLY", which is incorporated herein in its entirety by reference.

FIELD

The present application relates to the field of PCIEs, in particular to a PCIe switch working mode updating method and a related assembly.

BACKGROUND

With the sharp increase of data volume, a requirement for the computing power of a CPU (Central Processing Unit) is getting higher and higher. For this reason, more and more servers are equipped with more heterogeneous acceleration modules to improve the computing power of a system, which puts forward more requirements for external PCIe (Peripheral Component Interconnect express) resources of the CPU. On the one hand, a quantity of PCIe peripherals has to be provided as much as possible. On the other hand, a resource allocation method of the PCIe peripherals may be extended more, but is not limited to one resource allocation mode. As a PCIe switch chip, a PCIe switch may realize the expansion of the PCIe resources of the system, and the PCIe switch has a plurality of models and application modes. A main purpose of the change of a working mode of the PCIe switch is to reallocate a working mode of a PCIe port of the PCIe switch, including lanewidth, upstream/downstream, fabric port, etc.

At present, there are following existing technical solutions for changing the working mode of the PCIe switch: firstly, a link mode of Baseboard Management Controller (BMC)-switch-FLASH is adopted, a BMC upgrades an image file stored by the FLASH under the switch, after the upgrade is completed, the PCIe switch may work in a new working mode, however, in this solution, the BMC is required to upgrade the PCIe switch every time when the working mode of the PCIe switch is changed, and therefore, poor maintenance and use trouble are caused; and secondly, a plurality of Flash chips are prepared, firmwares of different FLASHs are loaded when the PCIe switch is started, and thus, the change of the working mode of the PCIe switch is realized, however, this solution supports finite working modes, may be used as a redundant backup, but may not perform an online refreshing function.

SUMMARY

An objective of the present application is to provide a PCIe switch working mode updating method and apparatus, an electronic device, and a computer-readable storage medium, by which a refreshing mode is simple, an online refreshing operation may be realized, and the flexibility is high.

In order to solve the above-mentioned technical problem, the present application provides a PCIe switch working mode updating method, which is applied to a controller, and the PCIe switch working mode updating method includes:

determining a required switch firmware version of a system according to system configuration information;
determining a current switch firmware version according to a current port definition state of a PCIe switch;
determining, according to the required switch firmware version and the current switch firmware version, whether a switch port reallocation operation needs to be executed; and
in response to the switch port reallocation operation needing to be executed, sending, to the PCIe switch, a data file corresponding to the required switch firmware version, so that the PCIe switch updates a working mode according to the data file.

In an embodiment of the present application, before the step of determining a required switch firmware version of a system according to system configuration information, the PCIe switch working mode updating method further includes:

defining and prestoring a first relationship matrix between the system configuration information and the required switch firmware version; and
correspondingly, the step of determining a required switch firmware version of a system according to system configuration information includes:
determining a current required switch firmware version according to current acquired system configuration information and the first relationship matrix.

In an embodiment of the present application, the PCIe switch working mode updating method further includes:
dividing a plurality of data blocks in a flash to respectively store the first relationship matrix and the required switch firmware version.

In an embodiment of the present application, the system configuration information includes an electrical level combination of a CONFIG signal corresponding to a current system topology structure.

In an embodiment of the present application, the controller is connected to the PCIe switch by a general-purpose input/output (GPIO) interface; and
correspondingly, the step of determining a current switch firmware version according to a current port definition state of a PCIe switch includes:
after the PCIe switch is powered on and the current switch firmware is loaded, acquiring an output state signal of the GPIO interface, and determining the current switch firmware version according to the output state signal.

In an embodiment of the present application, the controller is connected to the PCIe switch by a universal asynchronous receiver/transmitter (UART) interface and a serial debug port (SDB);
correspondingly, the PCIe switch working mode updating method further includes:
determining a working mode corresponding to the required switch firmware version;
correspondingly, the step of sending, to the PCIe switch, a data file corresponding to the required switch firmware version includes:
when the working mode is a basic mode, sending, to the PCIe switch through the SDB port, the data file corresponding to the required switch firmware version; and
when the working mode is an integrated mode, sending, to the PCIe switch through the UART interface, the data file corresponding to the required switch firmware version.

In an embodiment of the present application, before the step of sending, to the PCIe switch, a data file corresponding to the required switch firmware version, so that the PCIe switch updates a working mode according to the data file, the PCIe switch working mode updating method further includes:

determining a state of a current system;

in response to the state being a power-on state, suspending a power-on operation, and performing the operation of sending, to the PCIe switch, the data file corresponding to the required switch firmware version; and in response to the state being a standby state, forbidding the execution of the power-on operation, and performing the operation of sending, to the PCIe switch, the data file corresponding to the required switch firmware version.

In order to solve the above-mentioned technical problem, the present application further provides a PCIe switch working mode updating apparatus, which is applied to a controller, and the PCIe switch working mode updating apparatus includes:

a first determination module configured to determine a required switch firmware version of a system according to system configuration information;

a second determination module configured to determine a current switch firmware version according to a current port definition state of a PCIe switch;

a determination module configured to determine, according to the required switch firmware version and the current switch firmware version, whether a switch port reallocation operation needs to be executed, where a refreshing module is triggered in response to the switch port reallocation operation needing to be executed; and the refreshing module configured to send, to the PCIe switch, a data file corresponding to the required switch firmware version, so that the PCIe switch updates a working mode according to the data file.

In order to solve the above-mentioned technical problem, the present application further provides an electronic device, including:

a memory configured to store a computer program; and a controller configured to, when executing the computer program, implement the operations of the PCIe switch working mode updating method according to any one mentioned above.

In order to solve the above-mentioned technical problem, the present application further provides a computer-readable storage medium, having stored thereon, a computer program which, when executed by a processor, implements the operations of the PCIe switch working mode updating method according to any one mentioned above.

The present application provides a PCIe switch working mode updating method in which a slimline wiring form of the current system is determined according to the system configuration information, and thus, the required switch firmware version is determined; then, the required switch firmware version is compared with the current switch firmware version fed back according to the current port definition state of the PCIe switch; it may be determined, according to a comparison result, whether the working mode of the PCIe switch is changed; and when the working mode is changed, the switch port reallocation operation is performed on a port of the PCIe switch. By adopting the solution in the present application, it is unnecessary to upgrade the PCIe switch, and therefore, the operation is simple and convenient. Moreover, in the present application, it is also unnecessary to load different FLASH firmware to adapt to the change of the working mode of the PCIe switch when the PCIe switch is started, and it is only necessary to send the data file corresponding to the required switch firmware version to the PCIe switch and refresh the PCIe switch when it is detected that the working mode of the PCIe switch is changed, so that an online refreshing operation may be realized, and the flexibility is high. The present application further provides a PCIe switch working mode updating apparatus, an electronic device and a computer-readable storage medium which have the same beneficial effects as the above-mentioned PCIe switch working mode updating method.

BRIEF DESCRIPTION OF THE DRAWINGS

In order to describe the embodiments of the present application more clearly, the accompanying drawings required for describing the embodiments will be briefly introduced below. Apparently, the accompanying drawings in the following description show only some embodiments of the present application, and those of ordinary skill in the art may still derive other accompanying drawings from these accompanying drawings without creative efforts.

FIG. 2 is a schematic diagram showing a first relationship matrix between a CONFIG signal and a required switch firmware version provided in the present application;

FIG. 3 is a schematic diagram showing a second relationship matrix between an output signal of a GPIO interface and a current switch firmware version provided in the present application;

DETAILED DESCRIPTION OF THE EMBODIMENTS

Cores of the present application are to provide a PCIe switch working mode updating method and apparatus, an electronic device, and a computer-readable storage medium, by which a refreshing mode is simple, an online refreshing operation may be realized, and the flexibility is high.

In order to make objectives, technical solutions and advantages of the embodiments of the present application clearer, the technical solutions in the embodiments of the present application will be described clearly and completely below in conjunction with the accompanying drawings in the embodiments of the present application. Apparently, the described embodiments are a part of the embodiments of the present application, not all the embodiments. Based on the embodiments in the present application, all other embodiments obtained by those of ordinary skill in the art without creative efforts shall fall within the protection scope of the present application.

Figure 1:
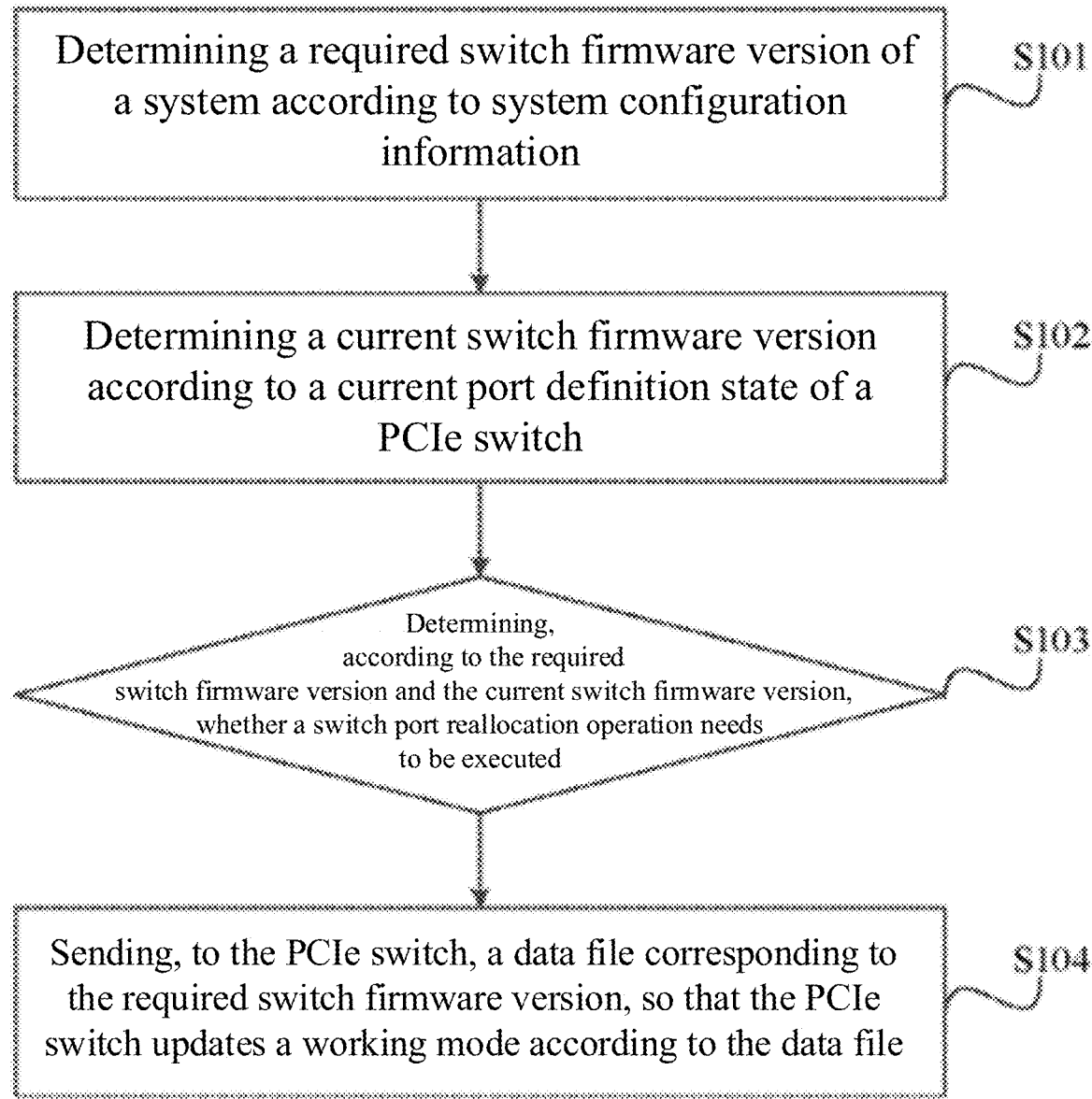
FIG. 1 is a flow chart showing steps of a PCIe switch working mode updating method provided in the present application.

Refer to FIG. 1 which is a flow diagram showing steps of a PCIe switch working mode updating method provided in the present application, the PCIe switch working mode updating method includes:

S101: determining a required switch firmware version of a system according to system configuration information.

Before S101-S104 are performed by a controller, the method further includes the step that operations of interconnecting slimline cables of the system, powering on the system and the like are performed according to a system configuration requirement. After the system is powered on, the controller is started to work, and the required switch firmware version of the system is determined according to the acquired system configuration information, where the system configuration information may include a system configuration signal, i.e., a configuration command (CONFIG) signal.

As an embodiment of the present application, before the step that a required switch firmware version of a system is determined according to system configuration information, the PCIe switch working mode updating method further includes:

defining and prestoring a first relationship matrix between the system configuration information and the required switch firmware version; and correspondingly, the step of determining a required switch firmware version of a system according to system configuration information includes:

determining the current required switch firmware version according to the current acquired system configuration information and the first relationship matrix.

As an embodiment of the present application, the system configuration information includes an electrical level combination of a CONFIG signal corresponding to the current system topology structure.

In some embodiments, two groups of x16 ports are led out of a PCIe switch and are connected to high-speed slimline connectors CONN A/B/C/D for external connection of different system units, and each connector defines a group of configuration pins corresponding to CONFIG_A/B/C/D signals. When system topologies are different, the slimline cables will be connected to different board cards and different PCIe ports. Correspondingly, the CONFIG_A/B/C/D signals will be pulled up or pulled down to be grounded, and thus, different electrical level combinations will appear. By defining the first relationship matrix, the controller may determine a relationship between the current interconnection topology and a switch port application mode. Therefore, by means of the acquired electrical level combination of the CONFIG signals, the current rated interconnection topology of the system may be determined, so that the switch port application mode required by the system is determined, and then, the required switch firmware version is determined according to the switch port application mode.

In some embodiments, referring to FIG. 2 which is a schematic diagram showing a first relationship matrix between a CONFIG signal and a required switch firmware version provided in the present application, due to different connection ways of the slimline cables, the configuration pins on the ports of each group of high-speed slimline connector CONN A/B/C/D may be set to have different 0/1 electrical level combinations, and the controller matches the required switch firmware version corresponding to the current system in the first relationship matrix by reading the CONFIG_A/B/C/D signals.

As an embodiment of the present application, the PCIe switch working mode updating method further includes:

dividing a plurality of data blocks in a flash to respectively store the first relationship matrix and the required switch firmware version.

In some embodiments, the plurality of data blocks are divided in the flash to respectively store a data file corresponding to the required switch firmware version and the first relationship matrix.

S102: determining the current switch firmware version according to the current port definition state of a PCIe switch.

As an embodiment of the present application, the controller is connected to the PCIe switch by a general-purpose input/output (GPIO) interface; and correspondingly, the step of determining the current switch firmware version according to the current port definition state of a PCIe switch includes:

after the PCIe switch is powered on and the current switch firmware is loaded, acquiring an output state signal of the GPIO interface, and determining the current switch firmware version according to the output state signal.

In some embodiments, the controller is connected to the PCIe switch by the GPIO interface, and the GPIO interface is used for outputting a signal for characterizing the current switch mode. After the PCIe switch is powered on and the currently used switch firmware is loaded, the GPIO interface may be configured to output a certain high/low electrical level, by reading a high/low electrical level state output by the GPIO interface, the controller determines the switch firmware under which the current PCIe switch works, and then, the current port definition state of the PCIe switch may be determined.

As shown in FIG. 3, under each switch firmware version, the GPIO interface of the switch may be configured to output different levels of 0/1 level combinations. After the PCIe switch is powered on, the controller may read a state of the GPIO interface to match the current switch firmware version.

S103: determining, according to the required switch firmware version and the current switch firmware version, whether a switch port reallocation operation needs to be executed, when the switch port reallocation operation needs to be executed, S104 is performed.

S104: sending a data file corresponding to the required switch firmware version to the PCIe switch, so that the PCIe switch updates a working mode according to the data file.

In some embodiments, after the required switch firmware version and the current switch firmware version are acquired, it is determined whether the required switch firmware version is consistent with the current switch firmware version, when the required switch firmware version is consistent with the current switch firmware version, a refreshing operation is not needed, and when the required switch firmware version is not consistent with the current switch firmware version, the switch port reallocation operation needs to be executed to adapt to the current system requirement.

In some embodiments, the data file corresponding to the required switch firmware version is sent to the PCIe switch, and after receiving the data file, the PCIe switch adjusts its parameters, and thus, the purpose of updating the working model is achieved.

It may be seen that, in the present embodiment, a wiring form of the slimline cables of the system is determined according to the system configuration information, and thus, the required switch firmware version is determined; then, the required switch firmware version is compared with the current switch firmware version fed back according to the current port definition state of the PCIe switch; it may be determined, according to a comparison result, whether the working mode of the PCIe switch is changed; and when the working mode is changed, the switch port reallocation operation is performed on a port of the PCIe switch. By adopting the solution in the present application, it is unnecessary to upgrade the PCIe switch, and therefore, the operation is simple and convenient. Moreover, in the present application, it is also unnecessary to load different FLASH firmware to adapt to the change of the working mode of the PCIe switch when the PCIe switch is started, and it is only necessary to send the data file corresponding to the required switch firmware version to the PCIe switch and refresh the PCIe switch when it is detected that the working mode of the PCIe switch is changed, so that an online refreshing operation may be realized, and the flexibility is high.

Based on the above-mentioned embodiment:

as an embodiment of the present application, the controller is connected to the PCIe switch by a universal asynchronous receiver/transmitter (UART) interface and a serial debug port (SDB);

correspondingly, the PCIe switch working mode updating method further includes:

determining a working mode corresponding to the required switch firmware version;

correspondingly, the step of sending a data file corresponding to the required switch firmware version to the PCIe switch includes:

when the working mode is a basic mode, sending the data file corresponding to the required switch firmware version to the PCIe switch through the SDB; and when the working mode is an integrated mode, sending the data file corresponding to the required switch firmware version to the PCIe switch through the UART interface.

In some embodiments, the UART interface and the SDB are further designed between the controller and the PCIe switch; the UART interface is used for refreshing switch firmware working in the integrated mode; and the SDB is used for refreshing switch firmware working in the basic mode.

In some embodiments, when it is determined that the PCIe switch firmware version needs to be refreshed, firstly, the working mode corresponding to the required switch firmware version is determined, and a corresponding refreshing interface is selected according to the working mode thereof, so that the refreshing efficiency and the stability are improved. In some embodiments, when the required switch firmware version works in the basic mode, the controller has to perform a refreshing action on the PCIe switch by using the SDB; and when the required switch firmware version works in the integrated mode, the controller performs a refreshing action on the PCIe switch by using the UART interface.

As an embodiment of the present application, before the step of sending a data file corresponding to the required switch firmware version to the PCIe switch, so that the PCIe switch updates a working mode according to the data file, the PCIe switch working mode updating method further includes:

determining a state of the current system;

in response to the state being a power-on state, suspending a power-on operation, and performing the operation of sending the data file corresponding to the required switch firmware version to the PCIe switch; and in response to the state being a standby state, forbidding the execution of the power-on operation, and performing the operation of sending the data file corresponding to the required switch firmware version to the PCIe switch.

Figure 4:
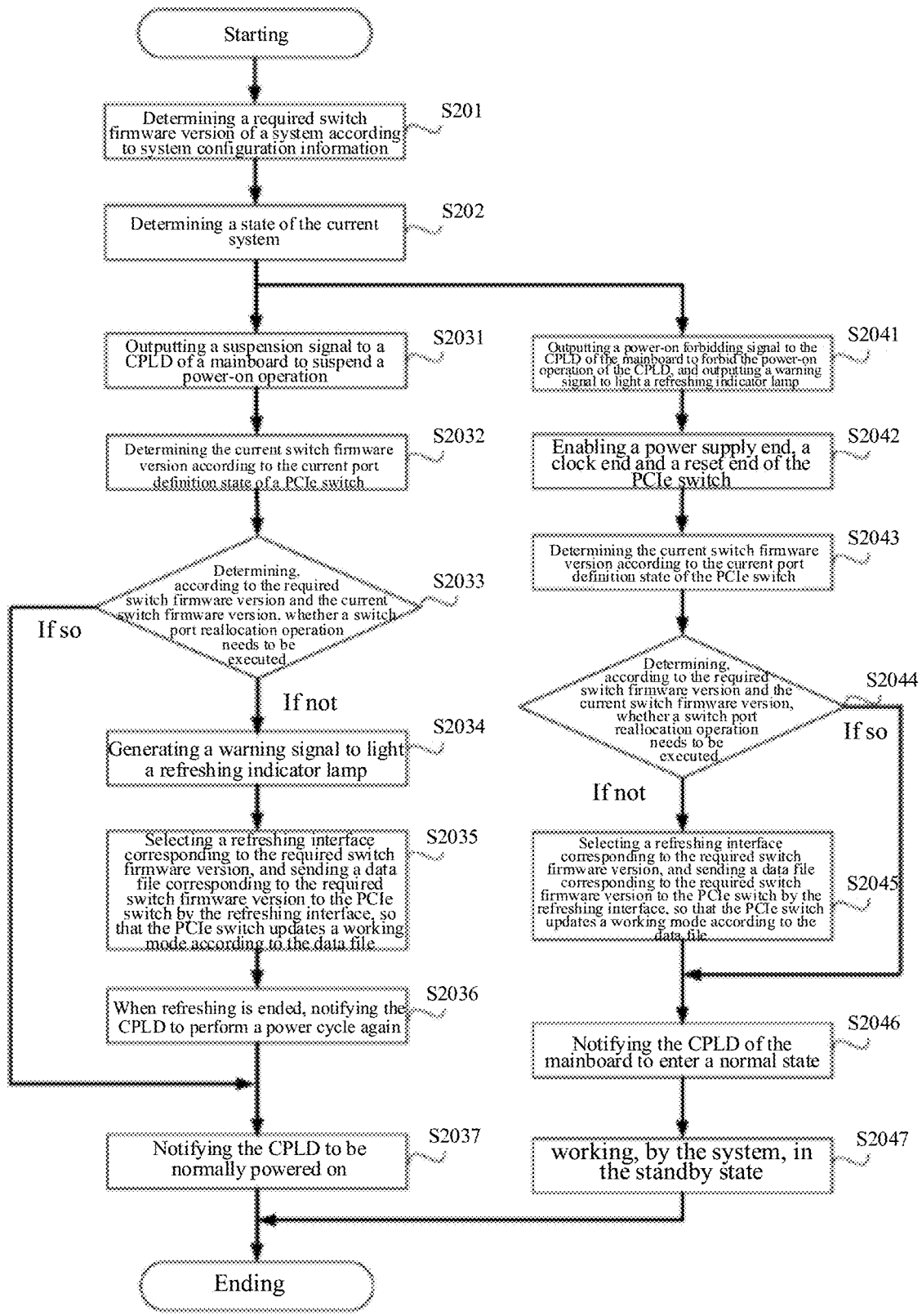
FIG. 4 is a flow chart showing steps of another PCIe switch working mode updating method provided in the present application.

In some embodiments, referring to FIG. 4 which is a flow chart showing steps of another PCIe switch working mode updating method provided in the present application, the PCIe switch working mode updating method includes:

S201: determining a required switch firmware version of a system according to system configuration information;

S202: determining a state of the current system; in response to the state being a power-on state, S203 is performed; and in response to the state being a standby state, S204 is performed;

S203 including:

S2031: outputting a suspension signal to a complex programmable logic device (CPLD) of a mainboard to suspend a power-on operation;

S2032: determining the current switch firmware version according to the current port definition state of a PCIe switch;

S2033: determining, according to the required switch firmware version and the current switch firmware version, whether a switch port reallocation operation needs to be executed, when the switch port reallocation operation does not need to be executed, S2034 is performed, and when the switch port reallocation operation needs to be executed, S2037 is performed;

S2034: generating a warning signal to light a refreshing indicator lamp;

S2035: selecting a refreshing interface corresponding to the required switch firmware version, and sending a data file corresponding to the required switch firmware version to the PCIe switch by the refreshing interface, so that the PCIe switch updates a working mode according to the data file;

S2036: when refreshing is ended, notifying the CPLD to perform a power cycle again, and then, S2037 is performed; and S2037: notifying the CPLD to be normally powered on;

S204 including:

S2041: outputting a power-on forbidding signal to the CPLD of the mainboard to forbid the power-on operation of the CPLD, and outputting a warning signal to light a refreshing indicator lamp;

S2042: enabling a power supply end, a clock end and a reset end of the PCIe switch;

S2043: determining the current switch firmware version according to the current port definition state of the PCIe switch;

S2044: determining, according to the required switch firmware version and the current switch firmware version, whether a switch port reallocation operation needs to be executed, when the switch port reallocation operation does not need to be executed, S2045 is performed, and when the switch port reallocation operation needs to be executed, S2046 is performed;

S2045: selecting a refreshing interface corresponding to the required switch firmware version, and sending a data file corresponding to the required switch firmware version to the PCIe switch by the refreshing interface, so that the PCIe switch updates a working mode according to the data file;

S2046: notifying the CPLD of the mainboard to enter a normal state; and

S2047: the system works in the standby state.

In conclusion, due to the adoption of the solution in the present application, the required switch firmware version and the current switch firmware version of the system are reflected respectively by acquiring a CONFIG signal and a signal from the GPIO interface. By means of the controller, the required switch firmware version may be automatically compared with the current switch firmware version, the data file corresponding to the stored required switch firmware version may be loaded, and the action of refreshing the switch firmware may be automatically realized without human intervention and without affecting the normal power on/operation service.

Figure 5:
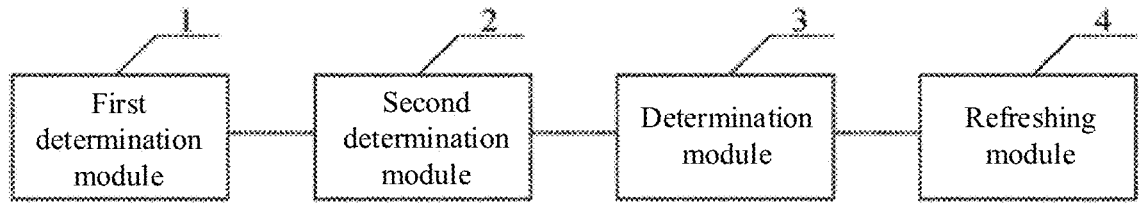
FIG. 5 is a schematic structural diagram showing a PCIe switch working mode updating apparatus provided in the present application.

Referring to FIG. 5, FIG. 5 is a schematic structural diagram showing a PCIe switch working mode updating apparatus provided in the present application, which is applied to a controller, the PCIe switch working mode updating apparatus includes:

a first determination module 1 configured to determine a required switch firmware version of a system according to system configuration information;

a second determination module 2 configured to determine the current switch firmware version according to the current port definition state of a PCIe switch;

a determination module 3 configured to determine, according to the required switch firmware version and the current switch firmware version, whether a switch port reallocation operation needs to be executed, where a refreshing module 4 is triggered in response to the switch port reallocation operation needing to be executed; and the refreshing module 4 configured to send, to the PCIe switch, a data file corresponding to the required switch firmware version, so that the PCIe switch updates a working mode according to the data file.

It may be seen that, in the present embodiment, a wiring form of slimline cables of the system is determined according to the system configuration information, and thus, the required switch firmware version is determined; then, the required switch firmware version is compared with the current switch firmware version fed back according to the current port definition state of the PCIe switch; it may be determined, according to a comparison result, whether the working mode of the PCIe switch is changed; and when the working mode is changed, the switch port reallocation operation is performed on a port of the PCIe switch. By adopting the solution in the present application, it is unnecessary to upgrade the PCIe switch, and therefore, the operation is simple and convenient. Moreover, in the present application, it is also unnecessary to load different FLASH firmware to adapt to the change of the working mode of the PCIe switch when the PCIe switch is started, and it is only necessary to send the data file corresponding to the required switch firmware version to the PCIe switch and refresh the PCIe switch when it is detected that the working mode of the PCIe switch is changed, so that an online refreshing operation may be realized, and the flexibility is high.

As an embodiment of the present application, the PCIe switch working mode updating apparatus further includes:

a pre-processing module configured to define and prestore a first relationship matrix between the system configuration information and the required switch firmware version; and correspondingly, the first determination module 1 is configured to:

determine the current required switch firmware version according to the current acquired system configuration information and the first relationship matrix.

As an embodiment, the PCIe switch working mode updating apparatus further includes:

a storage module configured to divide a plurality of data blocks in a flash to respectively store the first relationship matrix and the required switch firmware version.

As an embodiment, the system configuration information includes an electrical level combination of a CONFIG signal corresponding to the current system topology structure.

As an embodiment, the controller is connected to the PCIe switch by a GPIO interface; and correspondingly, the second determination module 2 is configured to:

after the PCIe switch is powered on and the current switch firmware is loaded, acquire an output state signal of the GPIO interface, and determine the current switch firmware version according to the output state signal.

As an embodiment, the controller is connected to the PCIe switch by a UART interface and an SDB;

correspondingly, the PCIe switch working mode updating apparatus further includes:

a port determination module configured to determine a working mode corresponding to the required switch firmware version;

correspondingly, the step of sending a data file corresponding to the required switch firmware version to the PCIe switch includes:

when the working mode is a basic mode, sending the data file corresponding to the required switch firmware version to the PCIe switch through the SDB; and when the working mode is an integrated mode, sending the data file corresponding to the required switch firmware version to the PCIe switch through the UART interface.

As an embodiment, the PCIe switch working mode updating apparatus further includes:

a monitoring module configured to determine a state of the current system; in response to the state being a power-on state, suspend a power-on operation, and perform the operation that the data file corresponding to the required switch firmware version is sent to the PCIe switch; and in response to the state being a standby state, forbid the execution of the power-on operation, and perform the operation that the data file corresponding to the required switch firmware version is sent to the PCIe switch.

On another hand, the present application further provides an electronic device, including:

a memory configured to store a computer program; and a controller configured to, when executing the computer program, implement the operations of the PCIe switch working mode updating method according to any one mentioned above.

In some embodiments, the present embodiment is described with two PCIe switches as examples, where each switch may provide four external ports S2/S3/S4/S5 designed to be PCIe slots of x16 lane to expand a PCIe device; and each switch additionally provides two ports S0/S1 designed to be in a CONN form of a high-speed connector.

In some embodiments, in the present embodiment, the controller may be a field programmable gate array (FPGA), and the memory may include a plurality of FLASH modules. In some embodiments, the PCIe switches may be externally designed with FLASH modules which are respectively a FLASH-0 and a FLASH-1 for storing switch firmware files loaded when the PCIe switches are powered on. The FPGA is responsible for automatically recognizing and detecting the change of system topology, comparing the current switch firmware version of the system with the required switch firmware version, and perform a refreshing action on the PCIe switches according to comparison results to reallocate the modes of the PCIe ports of the switch. The FPGA is externally connected with a group of DDR SDRAM internal memory for providing a storage space for running a FPGA program and registering temporary data. The FPGA is externally designed with a FLASH-2 module for storing FPGA firmware and loading a running program from FLASH-2 when the FPGA is powered on.

The FPGA module is externally designed with a FLASH-3 module, and the inside of the FLASH-3 is divided into different data blocks as required to respectively store the switch firmware and a relationship matrix. The FPGA loads a data file in a corresponding block area according to an actual system topology requirement and refresh the data file to the PCIe switch. A UART interface, a SDB and a GPIO interface are designed between the FPGA and the PCIe switch. The UART interface is configured to refresh switch firmware working in an integrated mode; the SDB is configured to refresh switch firmware working in a basic mode; and the GPIO interface is configured to characterize the working mode of the current PCIe switch, after the PCIe switch is powered on, and the switch firmware is loaded and started, the GPIO interface may be configured to output a certain high/low electrical level, and the FPGA reads the state of the GPIO interface and determines the firmware under which the PCIe switch works currently, and then, the port working state of the PCIe switch may be determined.

In some embodiments, two groups of x16 ports are led out of a PCIe switch and are connected to high-speed slimline connectors CONN A/B/C/D for external connection of different system units, and each connector defines a group of configuration pins corresponding to CONFIG_A/B/C/D signals. When system topologies are different, the slimline cables will be connected to different board cards and different PCIe ports. Correspondingly, the CONFIG_A/B/C/D signals will be pulled up or pulled down to be grounded, and thus, different electrical level combinations will appear. By defining the relationship matrix, the FPGA may determine a relationship between an interconnection topology and a switch port application mode.

Further, the FPGA is externally designed with a group of I2C interface for communication with a BMC. The BMC may realize modification on contents stored by FPGA FLASH-3, including updating for contents in a switch firmware data area and a relationship matrix data area, by means of such a group of I2C interface. In this way, for the same hardware board card, a different number of switch configuration modes may be defined according to an actual application requirement, so that hardware resources are reused to the maximum extent.

Figure 6:
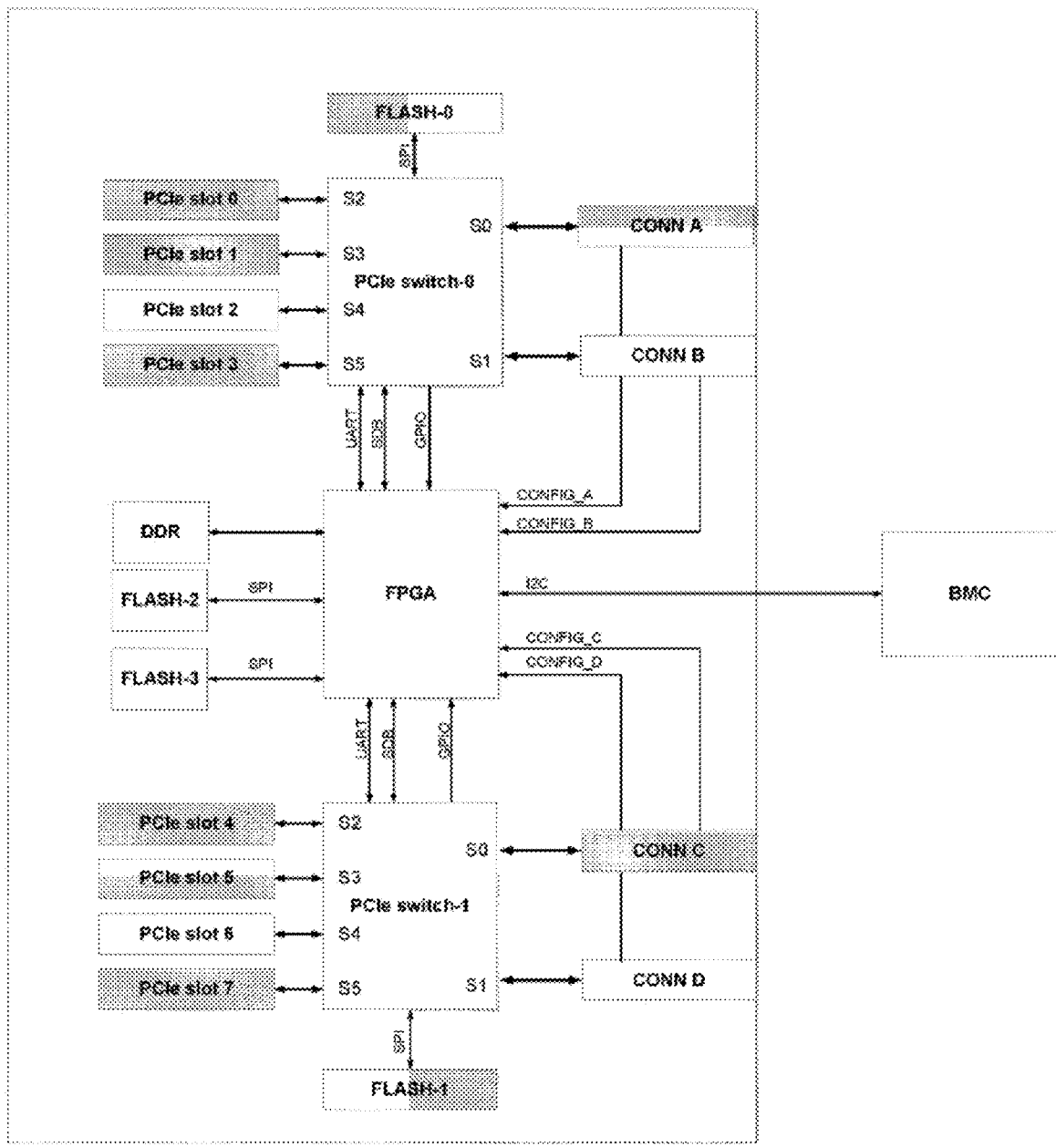
FIG. 6 is a diagram showing a PCIe switch port configuration principle provided in the present application.

Referring to FIG. 6, an implementation of PCIe switch port allocation in the present application is further described:
due to different system topology relationships, the ports of the PCIe switch working in different modes.

Figure 7:
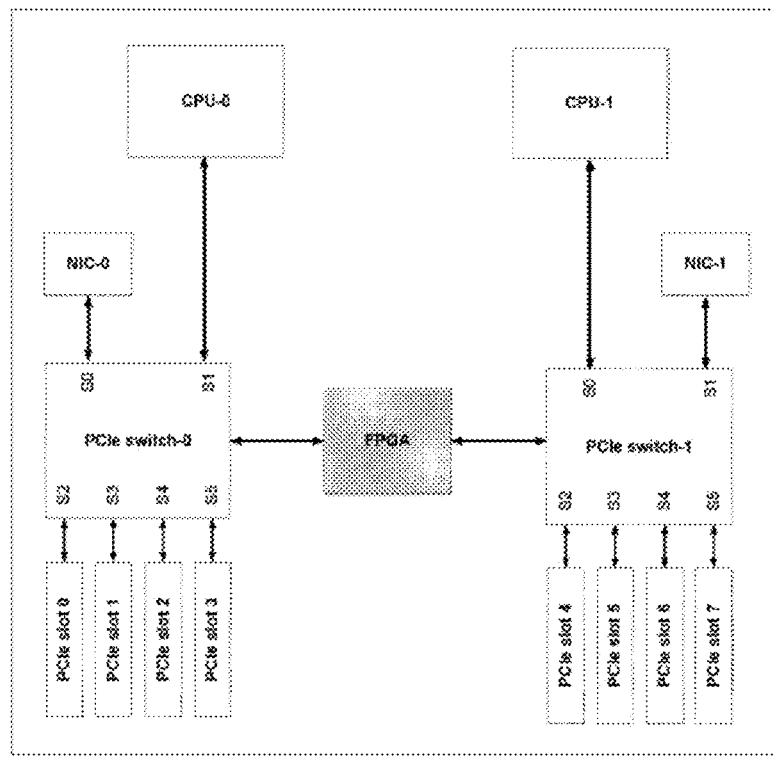
FIG. 7 is a schematic diagram showing a PCIe switch port configuration solution provided in the present application.
Figure 8:
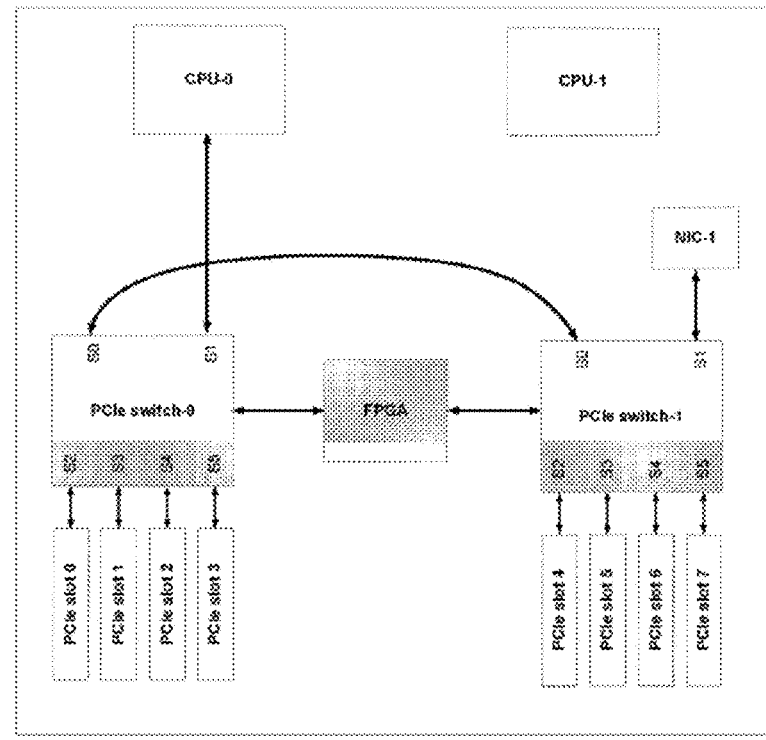
FIG. 8 is a schematic diagram showing another PCIe switch port configuration solution provided in the present application.

As shown in FIG. 7 and FIG. 8, the two PCIe switches work in the basic mode, port S1 of switch-0 and port S0 of switch-1 are connected to a PCIe on a CPU end and work in an upstream mode; and port S0 of switch-0 and port S1 of switch-1 are connected to an external NIC and work in a downstream mode.

Figure 9:
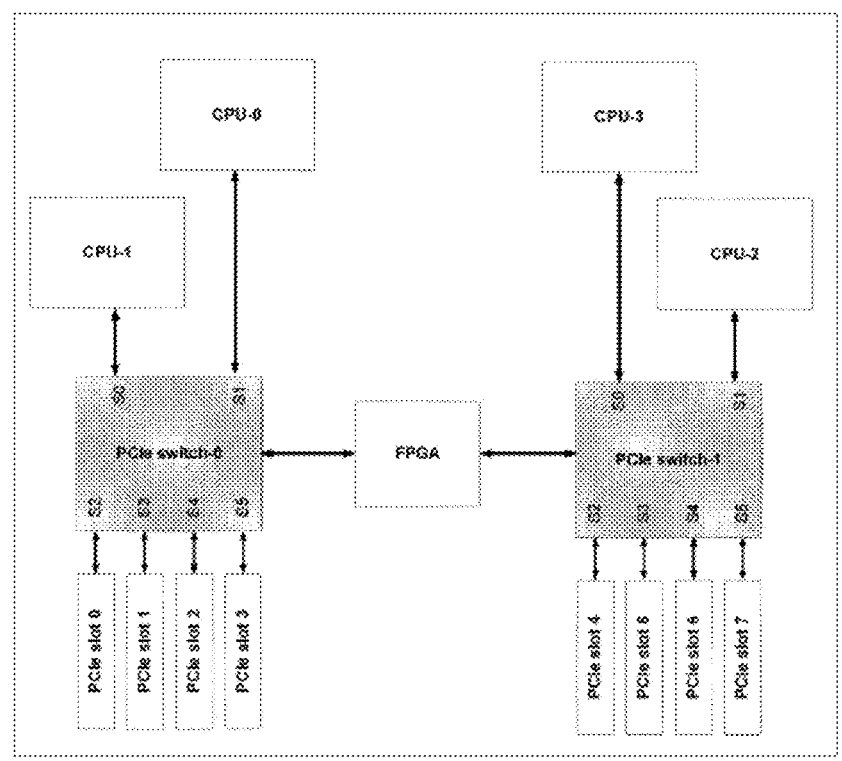
FIG. 9 is a schematic diagram showing further PCIe switch port configuration solution provided in the present application.

As shown in FIG. 9, the two PCIe switches work in the integrated mode, both of ports S0/S1 of switch-0/-1 work in the upstream mode, the inside of the switch will be allocated with two virtual switches, four PCIe device resources hung under the switch are allocated to two CPU modules corresponding to upstream.

In conclusion, due to the adoption of the solution in the present embodiment, the use requirement of a PCIe channel of the current system and the working state of the switch may be reflected respectively by a CONFIG signal and a signal from the GPIO interface of the switch, and by means of the FPGA, the working mode of the switch may be automatically compared, and the action of refreshing the switch firmware may be automatically realized by loading the stored firmware without human intervention and without affecting the normal power on/operation service. The I2C interface is designed between the BMC and the FPGA, and by defining a software protocol, a plug-in FLASH of the FPGA may be updated, that is, a mode-matched matrix relationship and the stored switch firmware are refreshed, so that the same set of FPGA-Switch hardware board card may support more application requirements. The modular design solution may be easily adapted to different application scenarios and different switch working mode requirements, so that a set of hardware may perfectly cope with the switching of various switch PCIe port working modes, and the plug-in flash of the FPGA may store various switch firmware as required, which is no longer limited by a working mode defined by a single switch port.

On further aspect, the present application further provides a non-transitory computer-readable storage medium, having stored thereon, a computer program which, when executed by a processor, implements the steps of the PCIe switch working mode updating method described in any one of the embodiments mentioned above.

The introduction for the non-transitory computer-readable storage medium provided in the present application refers to the above-mentioned embodiments so as not to be repeated in the present application.

The non-transitory computer-readable storage medium provided in the present application has the same beneficial effects as the above-mentioned PCIe switch working mode updating method.

It should be further noted that relational terms such as first and second in the present description are only used to distinguish one entity or operation from another one, but do not necessarily require or imply the presence of any such actual relationship or order between these entities or operations. Moreover, terms "includes", "including" or any other variants thereof are intended to cover non-excludable inclusion, so that a process, method, article or device including a series of elements not only includes those elements, but also includes other elements not listed clearly, or further includes inherent elements of the process, method, article or device. In a case that there are no more limitations, elements defined by the word "including a . . . " do not exclude other same elements further existing in the process, method, article or device including the elements.

Due to the foregoing description of the disclosed embodiments, those skilled in the art may implement or use the present application. Various amendments to these embodiments will be obvious to those skilled in the art, and general principles defined in the present application may be achieved in the other embodiments without departing from the spirit or scope of the present application. Thus, the present application will be not limited to these embodiments shown in the present application, but shall accord with the widest scope consistent with the principles and novel characteristics disclosed by the present application.

The invention claimed is:

1. A peripheral component interface express (PCIe) switch working mode updating method, applied to a controller, wherein the PCIe switch working mode updating method comprises:
   determining a required switch firmware version of a system according to system configuration information;
   determining a current switch firmware version according to a current port definition state of a PCIe switch;
   determining, according to the required switch firmware version and the current switch firmware version, whether a switch port reallocation operation needs to be executed; and
   in response to the switch port reallocation operation needing to be executed, sending, to the PCIe switch, a data file corresponding to the required switch firmware version, so that the PCIe switch updates a working mode according to the data file.

2. The PCIe switch working mode updating method according to claim 1, wherein before the step of determining a required switch firmware version of a system according to system configuration information, the PCIe switch working mode updating method further comprises:
   defining and prestoring a first relationship matrix between the system configuration information and the required switch firmware version; and
   correspondingly, the step of determining a required switch firmware version of a system according to system configuration information comprises:
   determining a currently required switch firmware version according to current acquired system configuration information and the first relationship matrix.

3. The PCIe switch working mode updating method according to claim 2, wherein the PCIe switch working mode updating method further comprises:
   dividing a plurality of data blocks in a flash to respectively store the first relationship matrix and the required switch firmware version.

4. The PCIe switch working mode updating method according to claim 3, wherein the system configuration information comprises an electrical level combination of a CONFIG signal corresponding to a current system topology structure.

5. The PCIe switch working mode updating method according to claim 1, wherein the controller is connected to the PCIe switch by a general-purpose input/output (GPIO) interface; and
   correspondingly, the step of determining the current switch firmware version according to a current port definition state of a PCIe switch comprises:
   after the PCIe switch is powered on and the current switch firmware is loaded, acquiring an output state signal of the GPIO interface, and determining the current switch firmware version according to the output state signal.

6. The PCIe switch working mode updating method according to claim 1, wherein the controller is connected to the PCIe switch by a universal asynchronous receiver/transmitter (UART) interface and a serial debug (SDB) port;
   correspondingly, the PCIe switch working mode updating method further comprises:
   determining a working mode corresponding to the required switch firmware version;
   correspondingly, the step of sending, to the PCIe switch, a data file corresponding to the required switch firmware version comprises:
   when the working mode is a basic mode, sending, to the PCIe switch through the SDB port, the data file corresponding to the required switch firmware version; and
   when the working mode is an integrated mode, sending, to the PCIe switch through the UART interface, the data file corresponding to the required switch firmware version.

7. The PCIe switch working mode updating method according to claim 1, wherein before the step of sending, to the PCIe switch, the data file corresponding to the required switch firmware version, so that the PCIe switch updates the working mode according to the data file, the PCIe switch working mode updating method further comprises:
   determining a state of a current system;
   in response to the state being a power-on state, suspending a power-on operation, and performing the operation of sending, to the PCIe switch, the data file corresponding to the required switch firmware version; and
   in response to the state being a standby state, forbidding the execution of the power-on operation, and performing the operation of sending, to the PCIe switch, the data file corresponding to the required switch firmware version.

8. The PCIe switch working mode updating method according to claim 1, wherein before determining a required switch firmware version of a system according to system configuration information, the method further comprises:
   performing operations of interconnecting slimline cables of the system and powering on the system according to a system configuration requirement.

9. The PCIe switch working mode updating method according to claim 4, wherein two groups of x16 ports are led out of a PCIe switch, are connected to high-speed slimline connectors CONN A/B/C/D, and are used for external connection of different system units; and
   each of the connectors defines a group of configuration pins corresponding to CONFIG_A/B/C/D signals.

10. The PCIe switch working mode updating method according to claim 9, wherein when system topologies are different, the slimline cables are connected to different board cards and different PCIe ports; and
    the CONFIG_A/B/C/D signals are pulled up or pulled down to be grounded, and different electrical level combinations are formed.

11. The PCIe switch working mode updating method according to claim 10, wherein determining the currently required switch firmware version according to current acquired system configuration information and the first relationship matrix comprises:
    determining, by the controller, a relationship between current interconnection topologies and switch port application modes, according to the first relationship matrix;
    determining a current rated interconnection topology of the system according to the acquired electrical level combination of the CONFIG signals;
    determining the switch port application mode required by the system; and
    determining the required switch firmware version according to the switch port application mode.

12. The PCIe switch working mode updating method according to claim 9, wherein the method further comprises:
    matching, by the controller, the required switch firmware version corresponding to the current system in the first relationship matrix by reading the CONFIG_A/B/C/D signals.

13. An electronic device, comprising:
a memory storing a computer program; and
a controller configured to, when executing the computer program, implement operations comprising:
determining a required switch firmware version of a system according to system configuration information;
determining a current switch firmware version according to a current port definition state of a PCIe switch;
determining, according to the required switch firmware version and the current switch firmware version, whether a switch port reallocation operation needs to be executed; and
in response to the switch port reallocation operation needing to be executed, sending, to the PCIe switch, a data file corresponding to the required switch firmware version, so that the PCIe switch updates a working mode according to the data file.

14. The electronic device according to claim 13, wherein before the operation of determining the required switch firmware version of the system according to the system configuration information, the operations further comprise:
defining and prestoring a first relationship matrix between the system configuration information and the required switch firmware version; and
correspondingly, the step of determining the required switch firmware version of the system according to the system configuration information comprises:
determining a currently required switch firmware version according to current acquired system configuration information and the first relationship matrix.

15. The electronic device according to claim 14, wherein the operations further comprise:
dividing a plurality of data blocks in a flash to respectively store the first relationship matrix and the required switch firmware version.

16. The electronic device according to claim 15, wherein the system configuration information comprises an electrical level combination of a CONFIG signal corresponding to a current system topology structure.

17. A non-transitory computer-readable storage medium, having stored thereon, a computer program which, when executed by a processor, implements operations comprising:
determining a required switch firmware version of a system according to system configuration information;
determining a current switch firmware version according to a current port definition state of a PCIe switch;
determining, according to the required switch firmware version and the current switch firmware version, whether a switch port reallocation operation needs to be executed; and
in response to the switch port reallocation operation needing to be executed, sending, to the PCIe switch, a data file corresponding to the required switch firmware version, so that the PCIe switch updates a working mode according to the data file.

18. The non-transitory computer-readable storage medium according to claim 17, wherein before the operation of determining the required switch firmware version of the system according to the system configuration information, the operations further comprise:
defining and prestoring a first relationship matrix between the system configuration information and the required switch firmware version; and
correspondingly, the step of determining a required switch firmware version of a system according to system configuration information comprises:
determining a currently required switch firmware version according to current acquired system configuration information and the first relationship matrix.

19. The non-transitory computer-readable storage medium according to claim 18, wherein the operations further comprise:
dividing a plurality of data blocks in a flash to respectively store the first relationship matrix and the required switch firmware version.

20. The non-transitory computer-readable storage medium according to claim 19, wherein the system configuration information comprises an electrical level combination of a CONFIG signal corresponding to a current system topology structure.

* * * * *